April 7, 1953   H. W. COLLAR ET AL   2,634,410
RADAR BEACON DELAY STANDARDIZATION SYSTEM
Filed Sept. 10, 1949
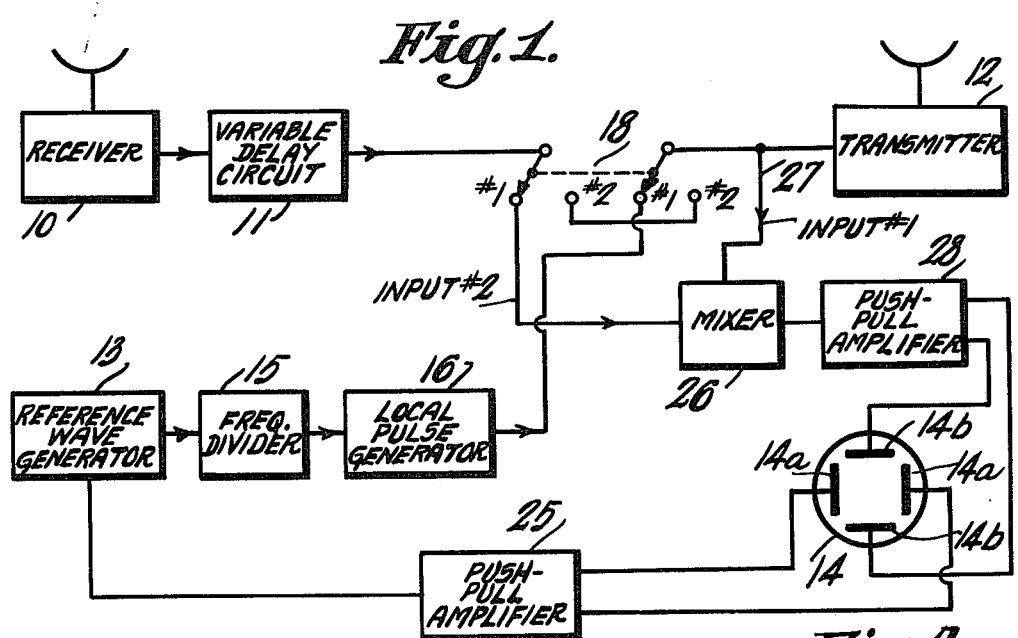
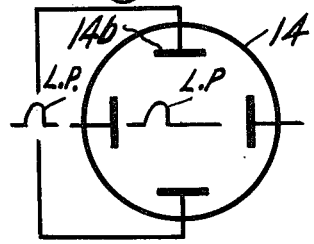
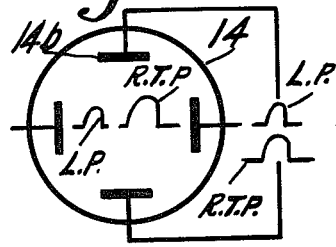
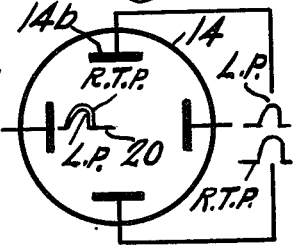
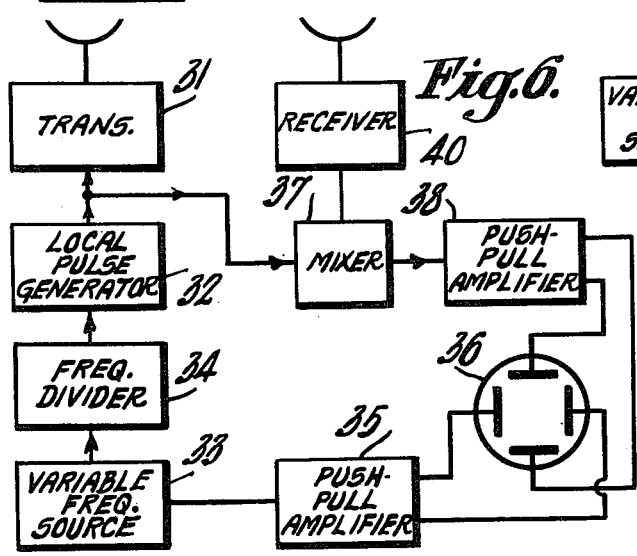
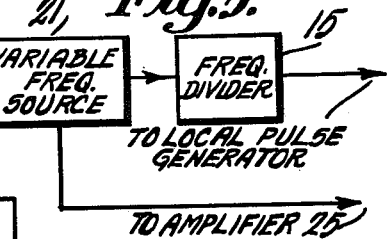
INVENTORS
HARLAN W. COLLAR
JOHN S. RUSSO
& MILTON J. MINNEMAN
BY
ATTORNEY Patented Apr. 7, 1953

2,634,410

UNITED STATES PATENT OFFICE 2,634,410

RADAR BEACON DELAY STANDARDIZATION SYSTEM

Harlan W. Collar, Sewell, N. J., John S. Russo, Philadelphia, Pa., and Milton J. Minneman, Baltimore, Md., assignors to Radio Corporation of America, a corporation of Delaware Application September 10, 1949, Serial No. 115,056

8 Claims. (Cl. 343—6)

1

This invention relates to a method of and means for metering the elapsed time between occurrences of sequential electrical impulses, and for facilitating the adjustment of the sequential occurrences of electrical impulses utilized in various types of electrical systems, and more particularly in radio range and bearing determining systems that employ pulse-modulated high frequency radio energy. More specifically, by way of example, the invention relates to a method of and means for standardizing the retransmission delay through a radar beacon such as used in a Shoran system.

In various circuits of the type above referred to, realization of the ultimate function of the system depends in a large degree on the precision with which the interval of time between the appearances of two successive pulses in the system can be measured or upon the exact establishment of a selected interval of time between the initiation of a circuit operation and the time an effective output is obtained from the circuit.

These critical factors that exist in numerous types of circuits employe to obtain precision measurements, and accordingly the invention hereinafter set forth in detail is applicable to all such systems, are especially related to the accurate operation of radar beacons used extensively in aerial navigation.

The radar beacon in an aerial navigation system is arranged to respond to a trigger signal propagated by the interrogator-response unit carried in the aircraft whose position is to be determined with respect to the beacon. In response to the triggering signal, the beacon emits a reply signal which is subsequently received by the unit of the system carried by the aircraft. Two such radar beacons may be spaced apart at known locations in order to provide two ranges to known reference points from which ranges the aircraft is enabled to accurately fix its position with respect to the fixed location of the beacons. The ranges obtained in this manner are a direct function of the time elapsing between the transmission of the interrogation pulse by the aircraft and the reception by the aircraft of the reply pulse propagated by the beacon. The beacon circuits, however, necessarily introduce a delay between the time of reception of the interrogating signal and the transmission of the reply signal. Consequently, the indicated range to the beacon will be in error in distance corresponding to the time delay of the circuits unless a corresponding compensation is made in the unit of the system carried by the aircraft. This can be satisfactorily accomplished when the delay introduced by the beacon is a known and constant value by, for example, delaying the range sweep of the aircraft unit for the known delay time.

The total delay introduced by the beacon results from a number of different conditions in the beacon circuits. For example, a narrow video band width in the beacon receiver will result in a variation of the time required for the received signal strength to reach some threshold value. Propagation time in the R. F. and the video connections may also represent an appreciable delay, as well as the rise time in low frequency I. F. amplifiers. In the instance wherein the beacon incorporates a circuit designed to accept only pulses having a pulse width greater than a certain predetermined width, the beacon, of course, must have an arbitrary delay introduced that is greater than the time corresponding to the pulse width. Since a number of the delays that contribute to the total delay are variable, it is desirable in most instances to add a sufficient delay factor to the circuit that will bring the beacon to an over-all delay of a selected value which can be accurately maintained in order to insure that the ranges to the beacon are indicated precisely.

Suitable circuits for establishing a selected over-all beacon delay may include multivibrators, phantastrons, delay lines, and variable bias stages triggered by sawtooth wave-form energy, or similar circuits that are adapted to produce the desired output signal at an adjustable time interval after the circuit operation has been initiated by the application of the interrogating signal pulse. It will be apparent that the continued and precise operation of the system depends upon the maintenance of the over-all delay introduced by the beacon at a constant and known value.

One of the objects of this invention is to provide a method of and means for measuring the elapsed time between the occurrence of successive electrical pulses. A further object of the invention is to provide a method of and means for facilitating standardization of the delay introduced by radar beacon circuits. A further object of the invention is to provide a radar beacon which is capable of a high degree of accuracy in consequence of the precise and continuous standardization of the delay between the reception of the interrogating signal and the transmission of the reply signal.

Further objects and advantages of the invention will be apparent from the following detailed description made with reference to the accompanying drawings.

In the drawings:

Figure 1 is a block diagram of a radar beacon comprising the instant invention;

Figure 2 is a schematic illustration of the trace produced on an oscilloscope when a sinusoidal wave is applied to the horizontal plates and a locally generated pulse to the vertical plates;

Figure 3 is a schematic diagram of the trace produced on an oscilloscope when a sinusoidal wave is applied to the horizontal plates and the locally generated pulse and a delayed pulse are applied to the vertical plates;

Figure 4 illustrates schematically the appearance of the oscilloscope trace when the variable delay circuit has been adjusted to produce a retransmission delay equal to the period of a sinusoidal wave pulse applied to the horizontal plates.

Figure 5 illustrates circuits employed in a modification of the invention; and

Figure 6 is a diagrammatic illustration of the invention applied to a radar ranging system.

In the several figures, similar parts are indicated by similar reference characters.

Referring to Figure 1, 10 represents the receiver component of a beacon system the output of which receiver is fed through a variable delay circuit 11 to normally initiate the operation of the transmitter 12. During such normal operation a switch 18 is in its No. 2 position. The variable delay circuit may comprise a delay line, a multivibrator, a phantastron or other similar circuit that is capable of adjustably varying the time interval between the application of the pulse output of the receiver 10 and the application of the pulse to the transmitter circuits.

The system also includes a crystal controlled sine wave source 13, the output of which is applied to the horizontal deflecting plates 14a of the oscilloscope 14 by way of a push–pull amplifier 25. A portion of the output of the source 13 is fed to the frequency divider 15 which divides the sine wave frequency to a suitable submultiple, for example, 1 to 20. The output of the frequency divider 15 is applied to a local pulse generator 16 which produces a pulse identical in shape to the receiver output pulse (observed at the output of delay circuit 11).

When standardizing the beacon delay, the switch 18 is in its No. 1 position. Thus, the pulse from generator 16 passes through switch 18 and triggers the transmitter 12. Simultaneously, this pulse is applied to the No. 1 input of pulse mixer 26 by way of lead 27, and from the mixer 26 it is applied to the vertical deflecting plates 14b of tube 14 by way of a push-pull amplifier 28.

It will be noted that when the switch 18 is in its No. 1 position, the received pulse is applied from the output of delay circuit 11 through switch 18 to the No. 2 input of the mixer 26.

The crystal controlled sine wave source 13 provides a reference wave form of a known frequency which may be the direct crystal frequency or a multiple or submultiple thereof, whose period corresponds to the desired retransmission delay which is to be introduced into the beacon system. As previously noted, the output of the source 13 is applied to the horizontal deflecting plates 14a of the oscilloscope 14. The application of this output alone to the oscilloscope would result in a horizontal trace.

As a result of the output pulse of the local pulse generator 16 being of shorter duration than the repetition period of the frequency of the source 13, the pulse output of generator 16 will occupy ony a portion of the trace produced by the application of the output of the source 13 to the horizontal deflecting plates. The vertical deflection caused by the application of the pulse output of generator 16 to the vertical deflecting plates 14b will occur on the horizontal trace and may be made to appear on the oscilloscope 14 in the form L. P., as illustrated in Figure 2. The signal propagated by the transmitter 12 when it has been triggered by the output of the local pulse generator 16 is received and passed as a pulse through the receiver component 10 and the variable delay circuit 11, and thereby is subjected to the full delay characteristic of the beacon system. This pulse thus delayed is also applied to the vertical deflecting plates 14b of the oscilloscope 14 by way of switch 18, and in the event the delay is less than the period of the sine wave source 13 the wave form R. T. P. will appear on the oscilloscope during the latter portion of the horizontal sweep cycle, as illustrated in Figure 3. It will be apparent, that if the delay introduced by the variable delay circuit 11 is equal to the period of the sine wave source 13, the deflection caused by the local pulse directly applied to the oscilloscope and that of the pulse subjected to the delay of the beacon will occur at the same point in the horizontal trace. Correspondingly, the variable delay 11 may be adjusted until the two pulses become superimposed on two successive sweeps of the beam 20 caused by the application of the output from the sine wave source 13 to the horizontal deflecting plate 14a. This condition is represented in Figure 4. As the pattern is produced as a result of the vertical deflection by the local pulse directly and by the retransmitted pulse at the same point in the cycle in the sine wave, the elapsed time between the occurrences of the pulses corresponds to the period of the sine wave output of the source 13.

It may be noted that the horizontal deflection amplifier 25 may be driven from the pulse generator 16 instead of from the generator 13, if desired. However, this will result in a slower horizontal sweep so that the two pulse indications cannot be brought into coincidence with as great accuracy as when the faster sweep is used.

It should be understood that the switch 18 need not be located at the particular point in the circuit shown. For example, the switch 18 together with the connection 27 may be located between the receiver 10 and the delay circuit 11. In fact, the switch 18 may be located at any convenient point in the video frequency circuit of the beacon.

The system may also be arranged to determine the interval of time between the occurrences of any two selected pulses. This may be accomplished by substituting for the sine wave source 13 an accurately calibrated variable frequency source 21 as indicated in Figure 5. Here again, the local pulse and the retransmitted signal pulse are both applied to the vertical deflection plates of the oscilloscope. In this instance, however, the adjustment of the wave forms appearing on the oscilloscope to coincidence is made by varying the frequency of the output of the variable frequency source 21. As the original frequency applied to the horizontal deflecting plates and the frequency to which the source 21 is adjusted to bring the wave forms appearing on the oscilloscope into coincidence are accurately known, the elapsed time between the occurrences of the pulses may be readily calculated.

The described system arranged to measure the elapsed time between the occurrences of two selected pulses may be adapted for use in conjunction with various type circuits one of which, by way of example, is illustrated in Figure 6 which represents the circuits of a distance determining radar set. The system therein illustrated comprises a transmitter 31 which, when keyed by the pulse output of a pulse generator 32, propagates a pulse-modulated radio frequency signal. The output of an accurately controlled adjustable calibrated frequency source 33 is applied to a frequency divider 34 which, at suitable submultiples of the frequency of the source 33 triggers the pulse generator 32. The output of the adjustable source 33 is also applied by way of a push-pull amplifier 35 to the horizontal deflecting plates of an oscilloscope 36.

Since it is desired to measure the elapsed time between the application of the trigger pulse output of the generator 32 to the transmitter 31 and the time of reception of the transmitted signal which may be reflected from a remote object, the trigger pulse is applied to the vertical deflection plates of the oscilloscope 36 by way of a mixer 37 and a push-pull amplifier 38. The reflected pulse picked up by the receiver 40 is also applied to the vertical deflection plates of tube 36 by way of the mixer 37 and the amplifier 38. The wave forms representing the respective pulses are brought into coincidence on the screen of the oscilloscope by appropriate adjustment of the variable frequency source 33. Since the frequency settings of the source 33 at which the pulses appear in coincidence are accurately known, the elapsed time between the application of the trigger pulse to the oscilloscope and the received pulse may be accurately determined.

There is thus disclosed an operating circuit in which there is a common point (between the variable delay circuit 11 and transmitter 12) that is responsive to sequential occurring pulses (one group of pulses occurring at the instants of the triggering of the transmitter in accordance with a multiple frequency of a generator and the other group occurring at the instants the transmitted pulses have been received directly from the transmitter and passed through the delay circuit, the time interval between the groups of pulses being proportional to the time delay of the operating circuit of which the common point is a part). These two sequential pulses are impressed on one set of deflection plates of an oscillograph and on the second set of deflection plates is impressed energy from the generator at its fundamental frequency. When the variable delay circuit is adjusted so that the delay in the operating circuit corresponds to the period of the frequency of the generator, as indicated by the two pulses from the common point being in coincidence on the oscillograph trace, the time interval between the two groups of pulses equals the period of the frequency of the generator. Conversely, if the frequency of the generator is varied until the oscillograph shows a coincidence of the pulses from the common point, the time delay in the operating circuit of which the common point is a part, is inversely proportional to the frequency of the generator.

There is thus disclosed a method of and apparatus for metering the sequential occurrences of electric pulses impressed at a common point in an operating circuit in the adjustment of the occurrences of the pulses to predetermined intervals of time and conversely a method of and apparatus for metering accurately the time interval between the occurrences of electric pulses at a common point in a circuit.

It should be understood that the oscilloscope need not be of the particular design illustrated. For example, deflecting coils may be employed rather than deflecting plates. Also, instead of applying the pulse to deflecting plates or coils for producing a pulse indication by vertical deflection, the pulse may be applied to the control grid of the cathode ray tube so as to produce an indication by brightening or darkening the time sweep trace. Usually, obtaining the pulse indication by deflection will be preferred because of the ease with which exact matching or superpositioning of the pulses can be determined.

We claim as our invention:

1. In a system for standardizing beacon delay, a radar beacon operating circuit comprising: a transmitter, a receiver, said receiver being arranged to receive directly a portion of the output of said transmitter, and a variable delay standardization circuit connected between said receiver and transmitter during normal beacon operation; an oscilloscope having horizontal deflecting means and vertical deflecting means; a reference wave generator for generating a wave form of known period; means for applying the output of said reference wave generator to one of said deflecting means of said oscilloscope; a local pulse generator; means for dividing the output of said reference wave generator to a submultiple frequency and for applying said submultiple frequency to said local pulse generator; means for applying the output of said local pulse generator to the other deflecting means of said oscilloscope and to said transmitter to trigger said transmitter during the standardizing operation; means connecting the output of said delay circuit to said other deflecting means of said oscilloscope during said standardizing operation and disconnecting it from said transmitter, whereby adjustment of the varable delay circuit will bring the wave forms appearing on said oscilloscope into coincidence with each other and whereby the delay introduced by said delay circuit will bring the said operating circuit to the known period of said reference wave form.

2. In a system for standardizing beacon delay, a radar beacon operating circuit comprising: a transmitter, a receiver, said receiver being arranged to receive a portion of the output of said transmitter, and a variable delay standardization circuit connected between said receiver and transmitter during normal beacon operation; an oscilloscope having horizontal deflecting means and vertical deflecting means; an adjustable reference wave generator for generating wave forms of known periods; means for applying the output of said generator to one of said deflecting means of said oscilloscope; a local pulse generator; means for dividing the output of said reference wave generator to a sub-multiple frequency and for applying said sub-multiple frequency to said local pulse generator; means for applying the output of said local pulse generator to the other deflecting means of said oscilloscope to produce an indication and to said transmitter to trigger said transmitter during the standardizing operation; means connecting the output of said delay circuit to said other deflecting means of said oscilloscope to produce a second indication during the standardizing operation and disconnecting it from said transmitter, whereby the frequency of the said reference wave generator when the two indications on the said oscilloscope are in coincidence is a measure of the elapsed time between instant of application of said local pulse generator to said transmitter and the instant of occurrence of the output of said delay circuit.

3. In a system for standardizing beacon delay, a radar beacon operating circuit comprising: a transmitter, a receiver, said receiver being arranged to receive directly a portion of the output of said transmitter, and a variable delay standardization circuit connected between said receiver and transmitter during normal beacon operation; an oscilloscope having horizontal deflecting means and vertical deflecting means; a reference wave generator for generating a waveform of known period; means for applying the output of said reference wave generator to one of said deflecting means of said oscilloscope; a local pulse generator; means for dividing the output of said reference wave generator to a submultiple frequency and for applying said submultiple frequency to said local pulse generator; means for applying the output of said local pulse generator to the other deflecting means of said oscilloscope and to said transmitter during the standardizing operation to trigger said transmitter; means connecting the output of said delay circuit to said other deflecting means of said oscilloscope during said standardizing operation and disconnecting it from said transmitter, whereby adjustment of the variable delay circuit will bring the wave forms appearing on said oscilloscope into coincidence with each other and whereby the delay introduced by said delay circuit will bring the said operating circuit to the known period of said reference wave form.

4. In a system for standardizing beacon delay, a radar beacon operating circuit comprising: a transmitter, a receiver, said receiver being arranged to receive directly a portion of the output of said transmitter, and a variable delay standardization circuit connected between said receiver and transmitter during normal beacon operation; an oscilloscope having horizontal deflecting means and vertical deflecting means; a reference wave generator for generating a wave form of known period; means for applying the output of said generator to one of said deflecting means of said oscilloscope; a local pulse generator; means for driving said local pulse generator in a fixed time relation to said reference wave; means for applying the output of said local pulse generator to the other deflecting means of said oscilloscope and to said transmitter to trigger said transmitter during the standardizing operation; means connecting the output of said delay circuit to said other deflecting means of said oscilloscope during the standardizing operation and disconnecting it from said transmitter, whereby adjustment of the variable delay circuit will bring the wave forms appearing on said oscilloscope into coincidence with each other and whereby the delay introduced by said delay circuit will bring the said operating circuit to the known period of said reference wave form.

5. In combination, a cathode ray tube including a screen and including means for producing a cathode ray and directing it against said screen, means including a generator supplying signal at a known repetition rate for deflecting said cathode ray repeatedly along a time axis, means for obtaining from said generator a pulse of short duration compared with the period of said generator signal, means for supplying said pulse to said cathode ray tube and producing an indication on said screen at a point on said time axis during a first time axis sweep, means for also supplying to apparatus that introduces a time delay a pulse derived from said generator which is of short duration compared with the period of said generator signal whereby a delayed pulse is obtained, said delay being sufficient to cause said delayed pulse to occur during a time axis sweep of the cathode ray following said first time axis sweep, means for causing said delayed pulse to produce a second indication on said screen at a point on said time axis during said following time axis sweep, and means for bringing said two indications into coincidence whereby the period of said generator is a measure of the amount of said delay.

6. A system for standardizing the delay introduced in a signal when passed through apparatus to be standardized, said system comprising a cathode ray tube including a screen and including means for producing a cathode ray and directing it against said screen, means including a generator supplying signal at a known repetition period for deflecting said cathode ray repeatedly along a time axis, means for obtaining from said generator a pulse of short duration compared with the period of said generator signal, means for supplying said pulse to said cathode ray tube and producing an indication on said screen at a point on said time axis during a first time axis sweep, means for also supplying a pulse derived from said generator to said apparatus to obtain a delayed pulse at the output of said apparatus, said delay being sufficient to cause said delayed pulse to occur during a time axis sweep of the cathode ray following said first time axis sweep, means for causing said delayed pulse to produce a second indication on said screen during said following time axis sweep, and means for adjusting the delay of said apparatus to a value that brings said two indications into coincidence whereby the period of said generator is a measure of the amount of said delay.

7. A system for standardizing the delay introduced in a signal when passed through apparatus to be standardized, said system comprising a cathode ray tube including a screen and including means for producing a cathode ray and directing it against said screen, means including a generator supplying signal at a known repetition period for deflecting said cathode ray repeatedly along a time axis, means for obtaining from said generator a pulse of short duration compared with the period of said generator signal, means for supplying said pulse to said cathode ray tube and producing an indication on said screen at a point on said time axis during a first time axis sweep, means for also supplying said short duration pulse to said apparatus to obtain a delayed pulse at the output of said apparatus, said delay being sufficient to cause said delayed pulse to occur during a time axis sweep of the cathode ray following said first time axis sweep, means for causing said delayed pulse to produce a second indication on said screen during said following time axis sweep, and means for adjusting the delay of said apparatus to a value that brings said two indications into coincidence whereby the period of said generator is a measure of the amount of said delay.

8. A system for standardizing the delay introduced in a signal when passed through apparatus to be standardized, said system comprising a cathode ray tube including a screen and including means for producing a cathode ray and directing it against said screen, means including a generator supplying signal at a known repetition period for deflecting said cathode ray repeatedly along a time axis, means for obtaining from said generator a pulse of short duration compared with the period of said generator signal, means for supplying said pulse to said cathode ray tube and producing an indication on said screen at a point on said time axis during a first time axis sweep, means for also supplying a pulse derived from said generator to said apparatus to obtain a delayed pulse at the output of said apparatus, said delay being sufficient to cause said delayed pulse to occur during the time axis sweep of the cathode ray immediately following said first time axis sweep, means for causing said delayed pulse to produce a second indication on said screen during said immediately following time axis sweep, and means for adjusting the delay of said apparatus to a value that brings said two indications into coincidence whereby the period of said generator is equal to the amount of said delay.

HARLAN W. COLLAR.
JOHN S. RUSSO.
MILTON J. MINNEMAN.

REFERENCES CITED

The following references are of record in the file of this patent:

UNITED STATES PATENTS

| Number | Name | Date |
| --- | --- | --- |
| 2,419,541 | De Rosa | Apr. 29, 1947 |
| 2,421,016 | Deloraine et al. | May 27, 1947 |
| 2,421,028 | King | May 27, 1947 |
| 2,422,382 | Winchel | June 17, 1947 |
| 2,414,477 | Meacham | Jan. 21, 1947 |
| 2,446,244 | Richmond | Aug. 3, 1948 |
| 2,453,970 | Charrier | Nov. 16, 1948 |
| 2,470,464 | Bowie | May 17, 1949 |